US011747985B2

(12) United States Patent
Jang et al.

(10) Patent No.: US 11,747,985 B2
(45) Date of Patent: Sep. 5, 2023

(54) MEMORY SYSTEM, INTEGRATED CIRCUIT SYSTEM, AND OPERATION METHOD OF MEMORY SYSTEM

(71) Applicant: SK hynix Inc., Gyeonggi-do (KR)

(72) Inventors: Munseon Jang, San Jose, CA (US); Hoiju Chung, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 135 days.

(21) Appl. No.: 17/507,442

(22) Filed: Oct. 21, 2021

(65) Prior Publication Data

US 2022/0043580 A1 Feb. 10, 2022

Related U.S. Application Data

(63) Continuation-in-part of application No. 16/939,741, filed on Jul. 27, 2020, now Pat. No. 11,322,219.

(60) Provisional application No. 62/944,586, filed on Dec. 6, 2019.

(51) Int. Cl.
*G06F 3/06* (2006.01)
*G06F 11/10* (2006.01)

(52) U.S. Cl.
CPC .......... *G06F 3/0611* (2013.01); *G06F 3/0619* (2013.01); *G06F 3/0655* (2013.01); *G06F 3/0679* (2013.01); *G06F 11/1048* (2013.01)

(58) Field of Classification Search
CPC .. G06F 11/1048; G06F 3/0611; G06F 3/0619; G06F 3/0655; G06F 3/0679
USPC ........................................................ 365/201
See application file for complete search history.

(56) References Cited

U.S. PATENT DOCUMENTS

| 8,862,963 | B2 | 10/2014 | Nakanishi et al. | |
|---|---|---|---|---|
| 10,102,064 | B1 | 10/2018 | Baty | |
| 11,030,040 | B2 | 6/2021 | Chung et al. | |
| 2013/0166986 | A1* | 6/2013 | Alrod | G06F 11/1048 |
| | | | | 714/755 |
| 2014/0075262 | A1* | 3/2014 | Kitasho | H03M 13/05 |
| | | | | 714/755 |
| 2016/0062829 | A1* | 3/2016 | Harasawa | H03M 13/2903 |
| | | | | 714/755 |
| 2016/0124784 | A1 | 5/2016 | Chung et al. | |

(Continued)

FOREIGN PATENT DOCUMENTS

JP H07-288820 A 10/1995

OTHER PUBLICATIONS

Notice of Allowance for the U.S. Appl. No. 17/679,804 issued by the United States Patent and Trademark Office dated Jan. 31, 2023.

(Continued)

*Primary Examiner* — Ly D Pham
(74) *Attorney, Agent, or Firm* — IP & T GROUP LLP

(57) ABSTRACT

A memory includes: a memory core; an error correction circuit suitable for correcting, when a number of one or more errors detected in data read from the memory core is equal to or greater than a threshold value, the detected errors based on an error correction code read from the memory core to produce an error-corrected data; and a data transferring circuit suitable for: outputting, when the detected errors are corrected, the error-corrected data according to a long read latency, and outputting, when the number of the detected errors is less than the threshold value or no error is detected in the read data, the read data according to a short read latency.

21 Claims, 10 Drawing Sheets

(56) References Cited

U.S. PATENT DOCUMENTS

| | | |
|---|---|---|
| 2018/0013451 A1* | 1/2018 | Kaynak ................. G11C 29/52 |
| 2018/0165151 A1 | 6/2018 | Lee et al. |
| 2019/0012230 A1 | 1/2019 | Chung et al. |
| 2019/0138392 A1 | 5/2019 | Jung |
| 2020/0142772 A1 | 5/2020 | Chung |
| 2021/0083690 A1 | 3/2021 | Jang et al. |

OTHER PUBLICATIONS

Notice of Allowance issued by the USPTO dated Jan. 6, 2022.
Notice of References Cited by Examiner(PTO-892) from U.S. Appl. No. 16/939,741.

* cited by examiner

MEMORY SYSTEM, INTEGRATED CIRCUIT SYSTEM, AND OPERATION METHOD OF MEMORY SYSTEM

CROSS-REFERENCE TO RELATED APPLICATION

The present application is a continuation-in-part application of U.S. patent application Ser. No. 16/939,741 filed on Jul. 27, 2020 which claims the benefit of U.S. Provisional Application No. 62/944,586, filed on Dec. 6, 2019. The disclosure of each of the foregoing applications is incorporated herein by reference in its entirety.

BACKGROUND

1. Field

Various embodiments of the present disclosure relate to a memory system and an integrated circuit system.

2. Discussion of the Related Art

At the initial stage of the semiconductor memory industry, many of memory chips had original good dies each having no defective cells distributed on a wafer. However, the increase in capacity of memory devices has made it difficult to fabricate a memory device having no defective cells. Currently, there is almost no probability that such a memory device will be fabricated. As a measure for overcoming such a situation, a method for repairing defective memory cells of a memory device with redundancy memory cells is used.

As another measure, an error correction circuit for correcting an error in a memory system is used to correct an error which occurs in a memory cell and an error which occurs while data are transmitted during a read/write process of the memory system.

SUMMARY

Various embodiments of the present disclosure are directed to a technology capable of reducing latency required for error correction while raising the efficiency of the error correction.

In an embodiment, a memory system may include: a memory controller suitable for transmitting write data and a first Error Correction Code (ECC) corresponding to the write data during a write operation; a first error correction circuit suitable for correcting an error within the transmitted write data when the error is detected within the transmitted write data, through the transmitted first ECC; a second ECC generation circuit suitable for generating a second ECC based on the transmitted write data when an error is not detected within the transmitted write data or the error-corrected write data when the error is corrected within the transmitted write data; and one or more memories suitable for storing the generated second ECC and the transmitted write data or the error-corrected write data.

In an embodiment, an integrated circuit system may include a first device, a second device and a third device, wherein the first device is suitable for transmitting upstream data and a first Error Correction Code (ECC) corresponding to the upstream data during an upstream operation, wherein the second device comprises: a first error correction circuit suitable for correcting an error within the transmitted upstream data when the error is detected within the transmitted upstream data, through the transmitted first ECC; and a second ECC generation circuit suitable for generating a second ECC based on the transmitted upstream data when an error is not detected within the transmitted upstream data or the error-corrected upstream data when the error is corrected within the transmitted upstream data, wherein the third device receives the generated second ECC and the transmitted upstream data or the error-corrected upstream data.

In an embodiment, an operation method of a memory system may include: transmitting, by a memory controller, write data and a first Error Correction Code (ECC) corresponding to the write data to a module controller; performing, by the module controller, a first operation of generating a second ECC based on the transmitted write data; finding and correcting, by the module controller, an error within the transmitted write data through the first ECC; canceling the first operation in response to the found error; performing, by the module controller, a second operation of generating the second ECC based on the error-corrected write data; and transmitting, by the module controller, the generated second ECC and the error-corrected write data to one or more memories.

In an embodiment, a memory system may include: a memory controller suitable for transmitting write data and a first write ECC corresponding to the write data during a write operation; a first error correction circuit suitable for detecting whether the write data received from the memory controller has an error, using the first write ECC received from the memory controller, and correcting the error when the error is detected; a second ECC generation circuit suitable for generating a second write ECC using the write data outputted from the first error correction circuit; and one or more memories suitable for storing the second write ECC and write data corresponding to the second write ECC, wherein the second write ECC has an error correction ability superior to that of the first write ECC.

In an embodiment, operation method of a controller may include: error-decoding write data through a first error correction code, the write data being provided with the first error correction code; error-encoding, when the provided write data is not error-corrected during the error-decoding of the provided write data, the provided write data to generate a second error correction code; error-encoding, when the provided write data is error-corrected during the error-decoding of the provided write data, the error-corrected write data to generate a third error correction code; and controlling a memory device to store therein a pair of the provided write data and the second error correction code or a pair of the error-corrected write data and the third error correction code.

In an embodiment, a memory includes: a memory core; an error correction circuit suitable for correcting, when a number of one or more errors detected in data read from the memory core is equal to or greater than a threshold value, the detected errors based on an error correction code read from the memory core to produce an error-corrected data; and a data transferring circuit suitable for: outputting, when the detected errors are corrected, the error-corrected data according to a long read latency, and outputting, when the number of the detected errors is less than the threshold value or no error is detected in the read data, the read data according to a short read latency.

In an embodiment, a memory includes: a memory; and a memory controller suitable for controlling the memory, wherein the memory includes: a memory core; an error correction circuit suitable for correcting, when a number of one or more errors detected in data read from the memory core is equal to or greater than a threshold value, the detected errors based on an error correction code read from the memory core to produce an error-corrected data; and a data transferring circuit suitable for: providing, when the detected errors are corrected, the memory controller with the error-corrected data according to a long read latency, and providing, when the number of the detected errors is less than the threshold value or no error is detected in the read data, the memory controller with the read data according to a short read latency.

In an embodiment, a method for operating a memory system includes: commanding, by a memory controller, a memory to perform a read operation for a first address; reading, by a memory, a first data and a first error correction code from a region designated by the first address in a memory core of the memory; detecting, by the memory, no error in the first data based on the first error correction code; providing, by the memory, the first data to the memory controller after a short read latency from the commanding regarding the read operation for the first address, in response to the detection of no error; commanding, by the memory controller, the memory to perform a read operation for a second address; reading, by the memory, a second data and a second error correction code from a region designated by the second address in the memory core of the memory; correcting, by the memory, an error in the second data based on the second error correction code to produce an error-corrected second data when the error is detected in the second data; and providing, by the memory, the error-corrected second data to the memory controller after a long read latency from the commanding regarding the read operation for the second address, in response to the correcting.

In an embodiment, a memory system includes: a memory; and a memory controller suitable for transferring a write data and a first write error correction code to the memory during a write operation, wherein the memory includes: a first error correction circuit suitable for correcting an error in the write data to produce an error-corrected write data when the error is detected on a basis of the first write error correction code; a second error correcting code generation circuit suitable for generating a second write error correction code based on the write data when any error is not detected in the write data and based on the error-corrected write data when the detected error is corrected; a memory core suitable for storing therein the second write error correction code and a corresponding one of the write data and the error-corrected write data; a second error correction circuit suitable for correcting one or more errors in data read from the memory core to produce an error-corrected read data when the errors are detected on a basis of a second read error correction code read from the memory core, a number of the detected errors in the read data being equal to or greater than a threshold value; a first error correction code generation circuit suitable for generating a first read error correction code based on the read data when the number of the detected errors is less than the threshold value or no error is detected in the read data and based on the error-corrected read data when the detected errors are corrected; and a data transferring circuit suitable for: providing, when the detected error are corrected, the memory controller with the error-corrected read data and the first read error correction code according to a long read latency, and providing, when the number of the detected errors is less than the threshold value or no error is detected in the read data, the memory controller with the read data and the first read error correction code according to a short read latency.

In an embodiment, a method for operating a memory system includes: providing, by a controller, a memory with a first read command for reading data stored in the memory while setting a first read latency; reporting, by the memory in response to the first read command, error-correction of the read data; providing, by the controller in response to the reporting, the memory with a second read command for reading the data while setting a second read latency; and providing, by the memory in response to the second read command, the controller with the error-corrected data according to the second read latency, wherein the second read latency is longer than the first read latency.

In accordance with the present embodiments, it is possible to reduce latency required for error correction while raising the efficiency of the error correction.

DETAILED DESCRIPTION

Figure 1:
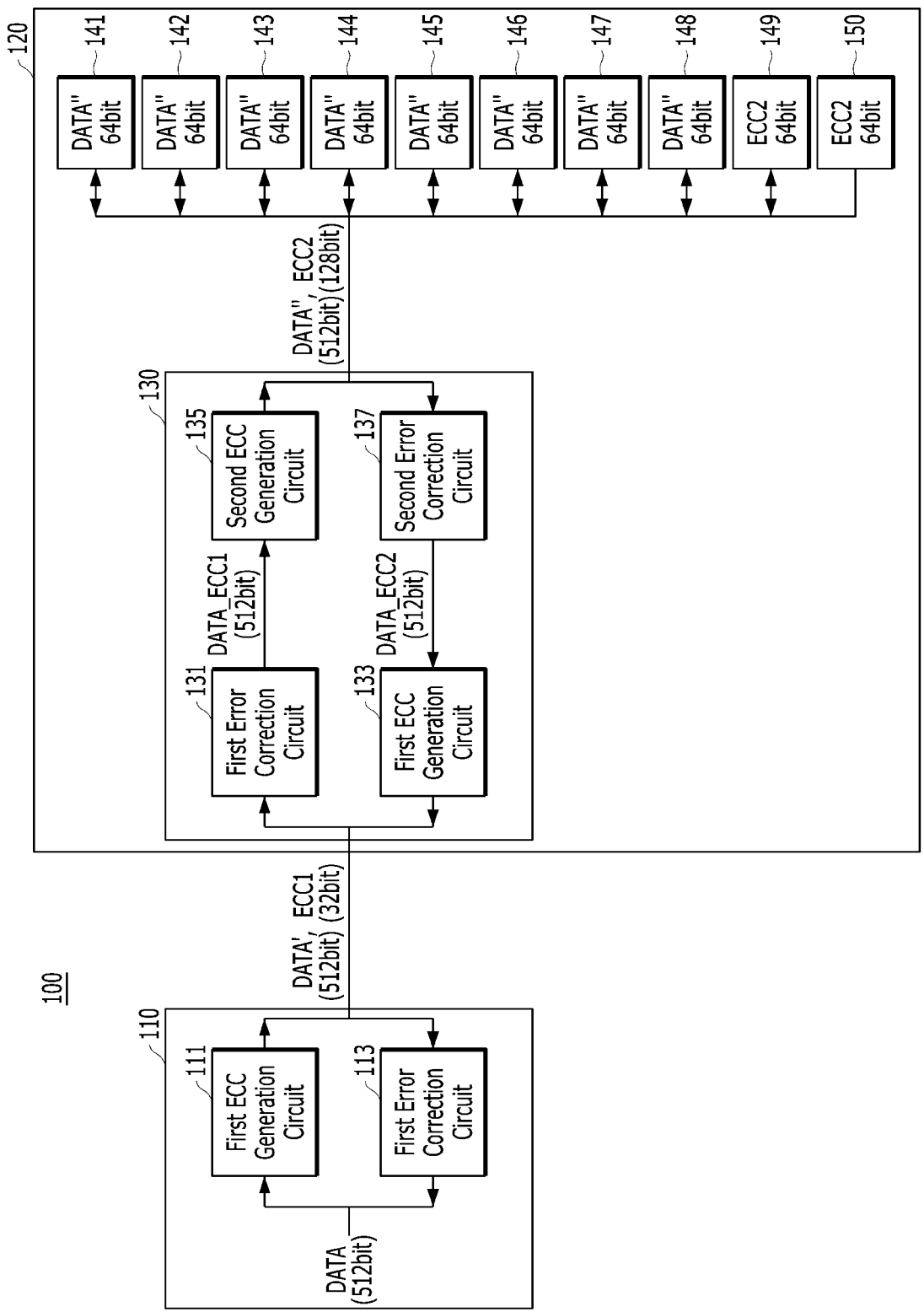
FIG. 1 is a configuration diagram illustrating a memory system 100 in accordance with an embodiment of the present disclosure.

Hereafter, various embodiments of the present disclosure will be described with reference to the accompanying drawings, in order to describe the present disclosure in detail such that a person skilled in the art to which the present disclosure pertains can easily carry out the technical spirit of the present disclosure. In the descriptions of the embodiments, components which are irrelevant to the subject matter of the embodiments may be omitted. When reference numbers are given to components of the drawings, the same components will be represented by like reference numerals even though the components are illustrated in different drawings.

FIG. 1 is a configuration diagram illustrating a memory system 100 in accordance with an embodiment of the present disclosure. FIG. 1 illustrates only parts which are directly related to data transmission and error correction in the memory system 100.

Referring to FIG. 1, the memory system 100 may include a memory controller 110 and a memory module 120. The memory controller 110 may control read and write operations of the memory module 120 according to a request of a host.

The memory controller 110 may include a first ECC (Error Correction Code) generation circuit 111 and a first error correction circuit 113.

The first ECC generation circuit 11 may generate a first ECC ECC1 based on data DATA transferred from the host, i.e. write data to be written to the memory module 120, during a write operation. The first ECC ECC1 may have a smaller number of bits and a lower error correction ability than a second ECC ECC2 which will be described below. Here, as an example the data DATA has 512 bits, and the first ECC ECC1 has 32 bits. During the write operation, the first ECC generation circuit 111 only generates the first ECC ECC1 based on the data DATA, and does not correct an error. Therefore, the data DATA may be equal to data DATA'. A reason why the data DATA has 512 bits is because 512-bit data is transferred during one write/read operation. However, this configuration may be different for each memory system. For example, there may be a memory system which writes or reads 256-bit data during one write/read operation and a memory system which writes or reads 128-bit data during one write/read operation.

During a read operation, the first error correction circuit 113 may detect an error within data DATA' transferred from the memory module 120, using the first ECC ECC1 from the memory module 120, and correct the detected error when the error is present. The data DATA' and the data DATA may be equal to each other when the data DATA' has no error, and different from each other when the data DATA' has an error. The data DATA may be transferred to the host. The term 'first' in the first ECC generation circuit 111 and the first error correction circuit 113 may indicate that the circuits use a first error correction method.

The memory module 120 may include a module controller 130 and memories 141 to 150. The memory module 120 may be configured in a DIMM (Dual In-Line Memory Module) type or a different type.

Write data transferred from the memory controller 110 during a write operation may be transferred to the memories 141 to 150 through the module controller 130, and read data transferred from the memories 141 to 150 during a read operation may be transferred to the memory controller 110 through the module controller 130. During this process, the module controller 130 may perform an operation of correcting an error. The module controller 130 may include a first error correction circuit 131, a first ECC generation circuit 133, a second ECC generation circuit 135 and a second error correction circuit 137.

During a write operation, the first error correction circuit 131 may detect an error within the data DATA' using the first ECC ECC1 from the memory controller 110, and correct the detected error when the error is present. The first error correction circuit 131 may use the first error correction method as indicated by the term 'first'. The data DATA' and data DATA_ECC1 may be equal to each other when the data DATA' has no error, and different from each other when the data DATA' has an error.

The second ECC generation circuit 135 may generate a second ECC ECC2 based on the data DATA_ECC1 on which the error correction operation has been performed by the first error correction circuit 131, during the write operation. The second ECC ECC2 may have a larger number of bits and a higher error correction ability than the first ECC ECC1. Here, the second ECC2 has 128 bits. The second ECC generation circuit 135 uses a second error correction method as indicated by the term 'second'. The second error correction method may have a greater error correction ability than the first error correction method. For example, when the first error correction method is a hamming method, the second error correction method may be an RS (Reed Solomon) method. This is only an example for the first and second error correction methods, and the first and second error correction methods may be simply different error correction methods. Desirably, the second error correction method may use an ECC with a larger number of bits than the first error correction method and have a greater error correction ability than the second error correction method. The second ECC generation circuit 135 only generates the second ECC ECC2 based on the data DATA_ECC1, and does not correct an error within the data DATA_ECC1. Therefore, the data DATA_ECC1 may be equal to data DATA".

The second error correction circuit 137 may detect an error within the data DATA" using the second ECC ECC2 read from the memories 141 to 150, and correct the detected error when the error is present. The second error correction circuit 137 may use the second error correction method as indicated by the term 'second'. The data DATA" and data DATA_ECC2 may be equal to each other when the data DATA" has no error, and different from each other when the data DATA" has an error.

The first ECC generation circuit 133 may generate the first ECC ECC1 based on the data DATA_ECC2. The first ECC generation circuit 133 only generates the first ECC ECC1 based on the data DATA_ECC2, and does not correct an error within the data DATA_ECC2. Therefore, the data DATA_ECC2 and the data DATA' may be equal to each other. The first ECC generation circuit 133 may use the first error correction method as indicated by the term 'first'.

Between the memory controller 110 and the module controller 130, the first error correction method is used. However, the second error correction method is used from the rear stage of the module controller 130. That is, the module controller 130 terminates the first error correction method, and uses the second error correction method different from the first error correction method. This is in order to perform a stronger error correction operation in the memory module 120.

Each of the memories 141 to 150 may store 64-bit data during one write operation, and output 64-bit data during one read operation. FIG. 1 illustrates a distribution pattern of the data DATA" and the second ECC ECC2 in the memories 141 to 150. The 512-bit data DATA" may be written to/read from the eight memories 141 to 148 among the 10 memories 141 to 150, and the 128-bit second ECC ECC2 may be written to/read from the two memories 149 and 150. The distribution pattern of the data DATA" and the second ECC ECC2 does not need to be configured in the same manner as described with reference to FIG. 1. The distribution pattern is not particularly limited as long as the data DATA" and the second ECC ECC2 are distributed and stored in the memories 141 to 150. Furthermore, the number of the memories 141 to 150 is not limited to 10, but may be set to a random number equal to or more than one. The memories 141 to 150 may be any type of memories such as a DRAM, PCRAM (Phase Change Random Access Memory) and Flash memory.

During a write operation, the data DATA is transferred to the memories 141 to 150 through the first ECC generation circuit 111, the first error correction circuit 131 and the second ECC generation circuit 135. During a read operation, the data DATA" outputted from the memories 141 to 150 may be transferred to the host through the second error correction circuit 137, the first ECC generation circuit 133 and the first error correction circuit 113. During the write operation, considerable latency occurs because the operations of the circuits 111, 131 and 135 are serially performed. Even during the read operation, considerable latency inevitably occurs because the operations of the circuits 137, 133 and 113 are serially performed.

Figure 2:
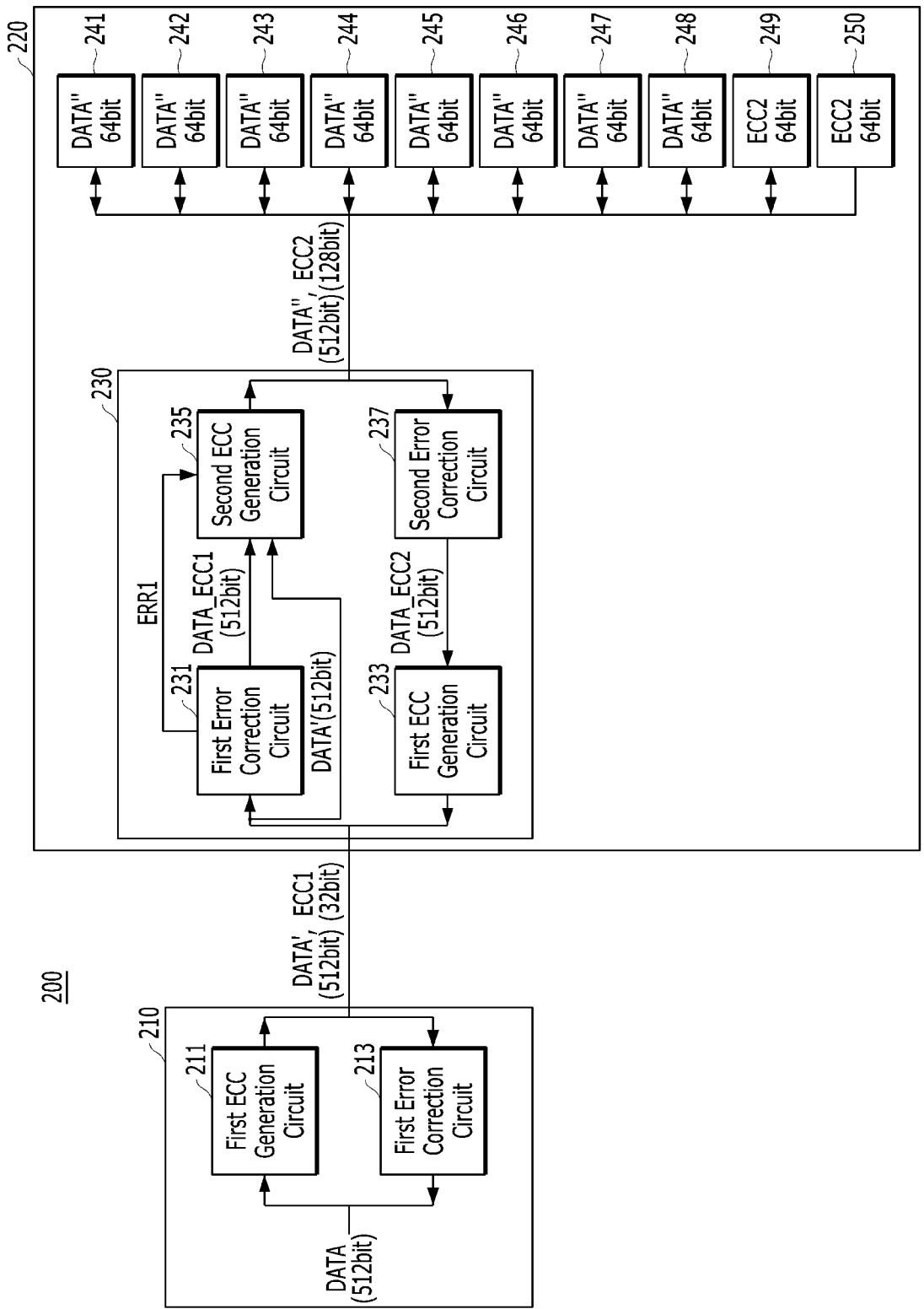
FIG. 2 is a configuration diagram illustrating a memory system 200 in accordance with an embodiment of the present disclosure.

FIG. 2 is a configuration diagram illustrating a memory system 200 in accordance with an embodiment of the present disclosure. FIG. 2 illustrates only parts which are directly related to data transmission and error correction in the memory system 200.

Referring to FIG. 2, the memory system 200 may include a memory controller 110 and a memory module 220. The memory controller 210 may control read and write operations of the memory module 220 according to a request of a host.

The memory controller 210 may include a first ECC generation circuit 211 and a first error correction circuit 213.

The first ECC generation circuit 211 may generate a first ECC ECC1 based on data DATA transferred from the host, i.e. write data to be written to the memory module 220, during a write operation. During the write operation, the first ECC generation circuit 211 only generates the first ECC ECC1 based on the data DATA, and does not correct an error. Therefore, the data DATA may be equal to data DATA'.

During a read operation, the first error correction circuit 213 may detect an error within data DATA' transferred from the memory module 220 using the first ECC ECC1 from the memory module 220, and correct the detected error when the error is present. The data DATA' and the data DATA may be equal to each other when the data DATA' has no error, and different from each other when the data DATA' has an error. The data DATA may be transferred to the host. The first ECC generation circuit 211 and the first error correction circuit 213 may use a first error correction method.

The memory module 220 may include a module controller 230 and memories 241 to 250. The memory module 220 may be configured as a DIMM type or a different type.

Write data transferred from the memory controller 210 during a write operation may be transferred to the memories 241 to 250 through the module controller 230, and read data transferred from the memories 241 to 250 during a read operation may be transferred to the memory controller 210 through the module controller 230. During this process, the module controller 230 may perform an operation of correcting an error. The module controller 230 may include a first error correction circuit 231, a first ECC generation circuit 233, a second ECC generation circuit 235 and a second error correction circuit 237.

During a write operation, the first error correction circuit 231 may detect an error within the data DATA' using the first ECC ECC1 transferred from the memory controller 210, and correct the detected error when the error is present. The first error correction circuit 231 may use the first error correction method. The data DATA' and data DATA_ECC1 may be equal to each other when the data DATA' has no error, and different from each other when the data DATA' has an error. An error signal ERR1 outputted from the first error correction circuit 231 may be enabled when an error within the data DATA' is detected.

During a write operation, the second ECC generation circuit 235 may perform a first operation of generating a second ECC ECC2 based on the data DATA' transferred from the memory controller 210. The first operation of the second ECC generation circuit 235 may be performed in parallel to the error correction operation of the first error correction circuit 231. Since the second ECC generation circuit 235 uses a second error correction method which is more complicated than the first error correction method used by the first error correction circuit 231, the time required for the first operation may be longer than the time required for the error correction operation of the first error correction circuit 231. When the first error correction circuit 231 detects an error, the error signal ERR1 may be enabled, and the second ECC generation circuit 235 may cancel the first operation in response to the enabled error signal ERR1. Then, the second ECC generation circuit 235 may perform a second operation of generating the second ECC ECC2 based on the data DATA_ECC1 whose error has been corrected by the first error correction circuit 231, not the data DATA'. That is, the second ECC generation circuit 235 may basically generate the second ECC ECC2 based on the data DATA'. However, only when an error is found in the data DATA', the second ECC generation circuit 235 may generate the second ECC ECC2 based on the data DATA_ECC1 whose error has been corrected. In most cases in which the data DATA' has no error, the first operation of the second ECC generation circuit 235 is performed in parallel to the error correction operation of the first error correction circuit 231. Therefore, the second ECC ECC2 may be quickly generated.

Since the second ECC generation circuit 235 quickly generates the second ECC ECC2 when the data DATA' has no error, the latency required for the write operation of the memory system 200 may be reduced more than in the memory system 100. Although the data DATA' has an error, the latency required for the write operation of the memory system 200 may be only equal to that of the memory system 100, and not be increased.

The second error correction circuit 237 may detect an error within data DATA" using the second ECC ECC2 read from the memories 241 to 250, and correct the detected error when the error is present. The second error correction circuit 237 may use the second error correction method. The data DATA" and data DATA_ECC2 may be equal to each other when the data DATA" has no error, and different from each other when the data DATA" has an error.

The first ECC generation circuit 233 may generate the first ECC ECC1 based on the data DATA_ECC2. The first ECC generation circuit 233 only generates the first ECC ECC1 based on the data DATA_ECC2, and does not correct an error within the data DATA_ECC2. Therefore, the data DATA_ECC2 and the data DATA' may be equal to each other. The first ECC generation circuit 233 may use the first error correction method.

Between the memory controller 210 and the module controller 230, the first error correction method is used. However, the second error correction method is used from the rear stage of the module controller 230. That is, the module controller 230 terminates the first error correction method, and uses the second error correction method different from the first error correction method. This is in order to perform a stronger error correction operation in the memory module 220.

Each of the memories 241 to 250 may store 64-bit data during one write operation, and output 64-bit data during one read operation. FIG. 2 illustrates a distribution pattern of the data DATA" and the second ECC ECC2 in the memories 241 to 250. The 512-bit data DATA" may be written to/read from the eight memories 241 to 248 among the 10 memories 241 to 250, and the 128-bit second ECC ECC2 may be written to/read from the two memories 249 and 250. The distribution pattern of the data DATA" and the second ECC ECC2 does not need to be configured in the same manner as described with reference to FIG. 2. The distribution pattern is not particularly limited as long as the data DATA" and the second ECC ECC2 are distributed and stored in the memories 241 to 250. Furthermore, the number of the memories 241 to 250 is not limited to 10, but may be set to a random number equal to or more than one. The memories 241 to 250 may be any type of memories such as a DRAM, PCRAM and Flash memory.

During a write operation, the data DATA are transferred to the memories 241 to 250 through the first ECC generation circuit 211 and the second ECC generation circuit 235, or transferred to the memories 241 to 250 through the first ECC generation circuit 211, the first error correction circuit 231 and the second ECC generation circuit 235. In most cases in which the data DATA' has no error, the data DATA is transferred to the memories 241 to 250 through the first ECC generation circuit 211 and the second ECC generation circuit 235. Thus, latency required during the write operation in the memory system 200 may be reduced more than in the memory system 100.

Figure 3:
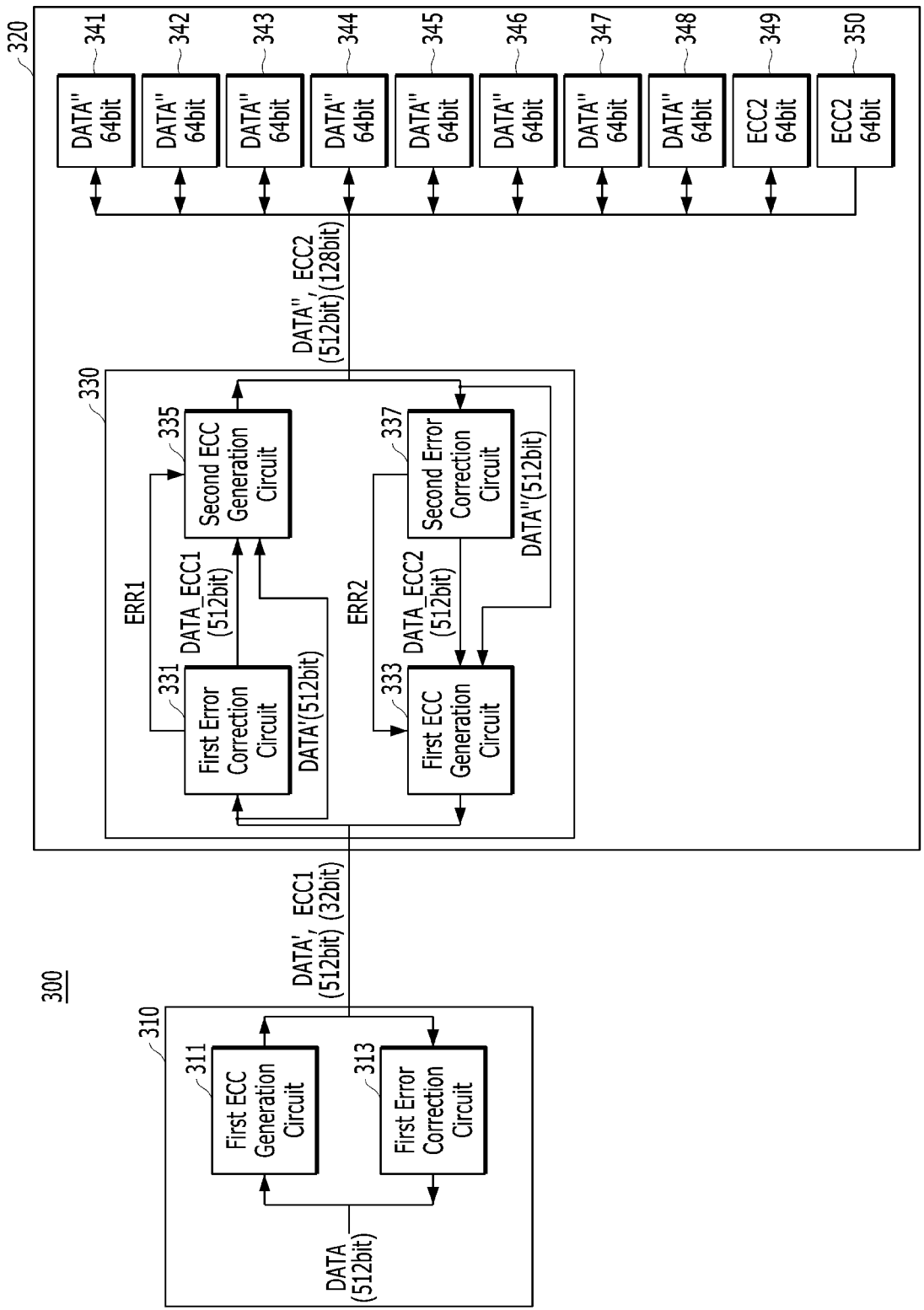
FIG. 3 is a configuration diagram illustrating a memory system 300 in accordance with an embodiment of the present disclosure.

FIG. 3 is a configuration diagram illustrating a memory system 300 in accordance with an embodiment of the present disclosure. FIG. 3 illustrates only parts which are directly related to data transmission and error correction in the memory system 300.

Referring to FIG. 3, the memory system 300 may include a memory controller 310 and a memory module 320. In the memory system 300 of FIG. 3, a second error correction circuit 337 and a first ECC generation circuit 333 within a module controller 330 may be different from those of the memory system 200 of FIG. 2.

The second error correction circuit 337 may detect an error within data DATA" using a second ECC ECC2 read from the memories 341 to 350, and correct the detected error when the error is present. The second error correction circuit 337 may use a second error correction method. The data DATA" and data DATA_ECC2 may be equal to each other when the data DATA" has no error, and different from each other when the data DATA" has an error. An error signal ERR2 outputted from the second error correction circuit 337 may be enabled when an error is detected.

The first ECC generation circuit 333 may perform a third operation of generating a first ECC ECC1 based on the data DATA" during a read operation. The third operation of the first ECC generation circuit 333 may be performed in parallel to the error correction operation of the second error correction circuit 337. When the second error correction circuit 337 detects an error, the error signal ERR2 may be enabled, and the first ECC generation circuit 333 may cancel the third operation in response to the enabled error signal ERR2. Then, the first ECC generation circuit 333 may perform a fourth operation of generating the first ECC ECC1 based on the data DATA_ECC2 whose error has been corrected by the second error correction circuit 337, not the data DATA". That is, the first ECC generation circuit 333 may basically generate the first ECC ECC1 based on the data DATA". However, only when an error is found in the data DATA", the first ECC generation circuit 333 may generate the first ECC ECC1 based on the data DATA_ECC2 whose error has been corrected.

Since the first ECC generation circuit 333 quickly generates the first ECC ECC1 when the data DATA" has no error, the latency required for the write operation of the memory system 300 may be reduced more than in the memory systems 100 and 200. Although the data DATA" has an error, latency required for the write operation of the memory system 300 may be only equal to those of the memory systems 100 and 200, and not be increased.

Figure 4:
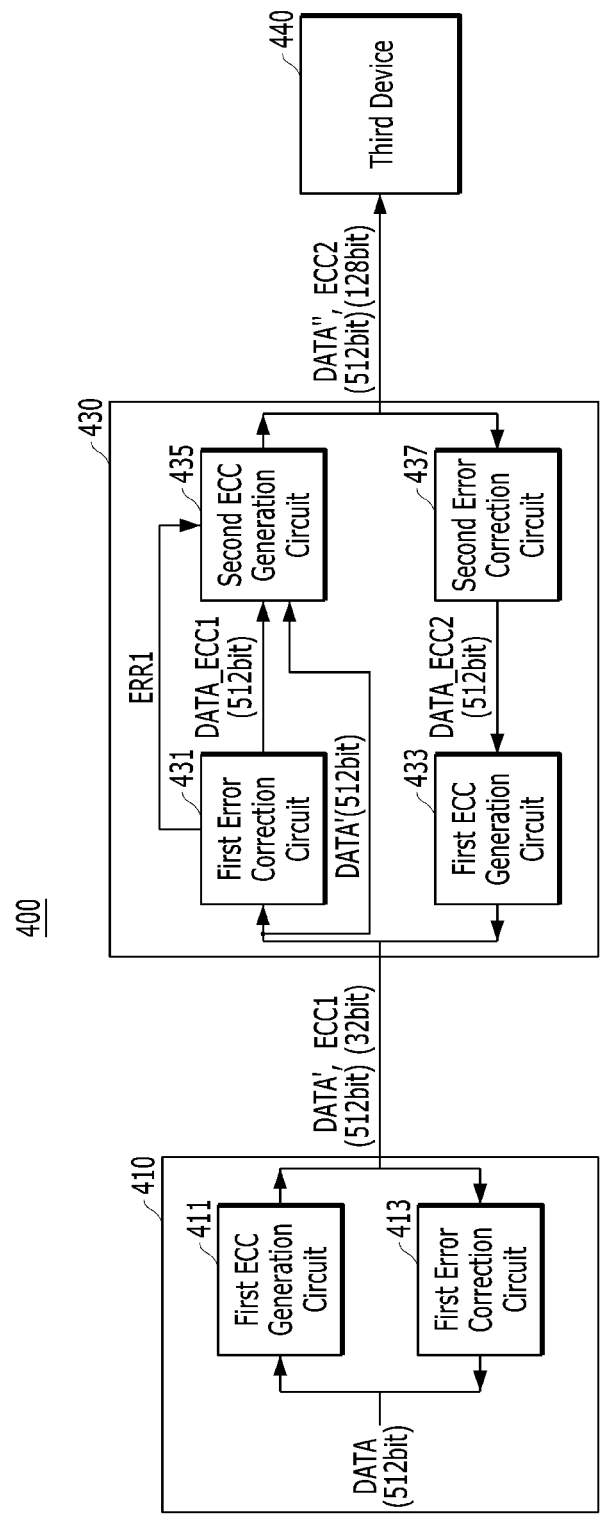
FIG. 4 is a configuration diagram illustrating an integrated circuit system 400 in accordance with an embodiment of the present disclosure.

FIG. 4 is a configuration diagram illustrating an integrated circuit system 400 in accordance with an embodiment of the present disclosure. FIG. 4 illustrates an example in which the present embodiment is not applied to a memory system, but applied to a different type of integrated circuit system 400.

The integrated circuit system 400 may include a first device 410, a second device 430 and a third device 440. Each of the first device 410, the second device 430 and the third device 440 may indicate a device for transmitting/receiving data, and include one or more integrated circuit chips. In the following descriptions, an upstream operation may indicate an operation in which data are transmitted in a direction of the first device 410→the second device 430→the third device 440, and a downstream operation may indicate an operation in which data are transmitted in a direction of the third device 440→the second device 430→the first device 410.

The first device 410 may include a first ECC generation circuit 411 and a first error correction circuit 413.

The first ECC generation circuit 411 may generate a first ECC ECC1 based on data DATA to be transferred toward the third device during the upstream operation. During the upstream operation, the first ECC generation circuit 211 only generates the first ECC ECC1 based on the data DATA, and does not correct an error. Therefore, the data DATA may be equal to data DATA'.

During the downstream operation, the first error correction circuit 413 may detect an error within the data DATA' transferred from the second device 430 using the first ECC ECC1 from the second device 430, and correct the detected error when the error is present. The data DATA' and the data DATA may be equal to each other when the data DATA' has no error, and different from each other when the data DATA' has an error. The data DATA may be transferred to the host. The first ECC generation circuit 411 and the first error correction circuit 413 may use a first error correction method.

The second device 430 may include a first error correction circuit 431, a first ECC generation circuit 433, a second ECC generation circuit 435 and a second error correction circuit 437.

During the upstream operation, the first error correction circuit 431 may detect an error within the data DATA' using the first ECC ECC1 transferred from the first device 410, and correct the detected error when the error is present. The first error correction circuit 431 may use the first error correction method. The data DATA' and data DATA_ECC1 may be equal to each other when the data DATA' has no error, and different from each other when the data DATA' has an error. An error signal ERR1 outputted from the first error correction circuit 431 may be enabled when an error within the data DATA' is detected.

The second ECC generation circuit 435 may perform a first operation of generating a second ECC ECC2 based on the data DATA' transferred from the first device 410 during the upstream operation. The first operation of the second ECC generation circuit 435 may be performed in parallel to the error correction operation of the first error correction circuit 431. Since the second ECC generation circuit 435 uses a second error correction method which is more complicated than the first error correction method, the time required for the first operation may be longer than the time required for the error correction operation of the first error correction circuit 431. When the first error correction circuit 431 detects an error, the error signal ERR1 may be enabled, and the second ECC generation circuit 435 may cancel the first operation in response to the enabled error signal ERR1. Then, the second ECC generation circuit 235 may perform a second operation of generating the second ECC ECC2 based on the data DATA_ECC1 whose error has been corrected by the first error correction circuit 431, not the data DATA'. That is, the second ECC generation circuit 435 may basically generate the second ECC ECC2 based on the data DATA'. However, only when an error is found in the data DATA', the second ECC generation circuit 435 may generate the second ECC ECC2 based on the data DATA_ECC1 whose error has been corrected. In most cases in which the data DATA' has no error, the first operation of the second ECC generation circuit 435 is performed in parallel to the error correction operation of the first error correction circuit 431. Therefore, the second ECC ECC2 may be quickly generated.

During the downstream operation, the second error correction circuit 437 may detect an error within data DATA' using the second ECC ECC2 transferred from the third device 440, and correct the detected error when the error is present. The second error correction circuit 437 may use the second error correction method. The data DATA" and data DATA_ECC2 may be equal to each other when the data DATA" has no error, and different from each other when the data DATA" has an error.

The first ECC generation circuit 433 may generate the first ECC ECC1 based on the data DATA_ECC2. The first ECC generation circuit 433 only generates the first ECC ECC1 based on the data DATA_ECC2, but does not correct an error within the data DATA_ECC2. Therefore, the data DATA_ECC2 and the data DATA' may be equal to each other. The first ECC generation circuit 433 may use the first error correction method. FIG. 4 illustrates that the first ECC generation circuit 433 generates the first ECC ECC1 based on the data DATA_ECC2. However, the first ECC generation circuit 433 may generate the first ECC ECC1 based on the data DATA" or generate the first ECC ECC1 based on the data DATA_ECC2, depending on whether the first ECC generation circuit 433 detects an error within the data DATA", like the first ECC generation circuit 333 of FIG. 3.

The third device 440 may receive the data DATA" and the second error ECC ECC2 from the second device 430 during the upstream operation, and transmit the data DATA" and the second ECC ECC2 to the second device 430 during the downstream operation.

Figure 5:
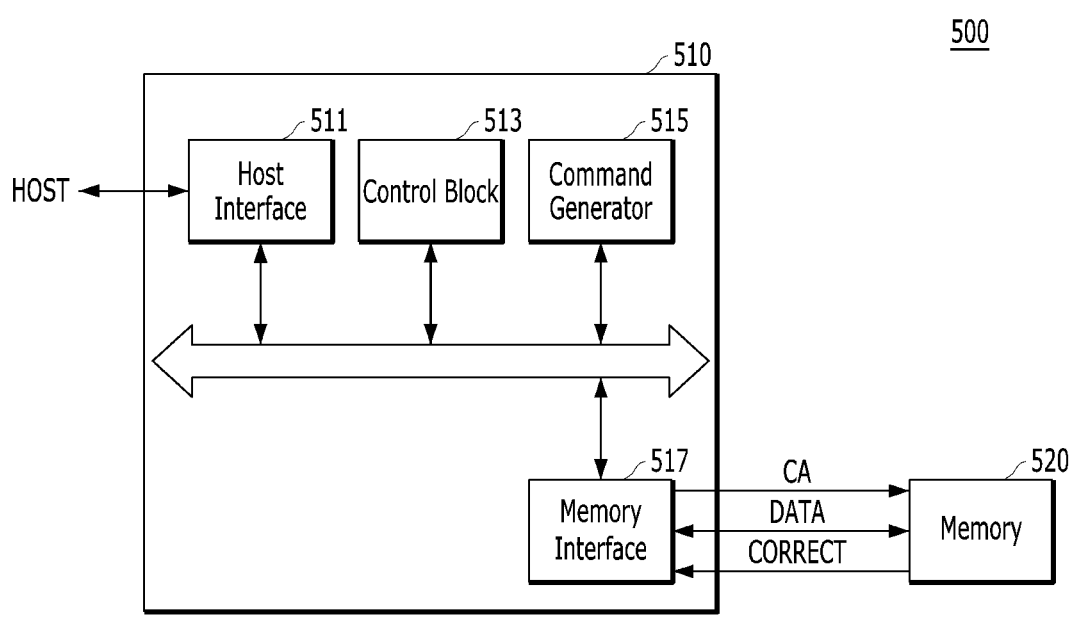
FIG. 5 is a configuration diagram illustrating a memory system 500 in accordance with an embodiment of the present disclosure.

FIG. 5 is a configuration diagram illustrating a memory system 500 in accordance with an embodiment of the present disclosure.

Referring to FIG. 5, the memory system 500 may include a memory controller 510 and a memory 520.

The memory controller 510 may control the operation of the memory 520 according to a request from the host HOST. The host HOST may include a Central Processing Unit (CPU), a Graphic Processing Unit (GPU), an Application Processor (AP), and the like. The memory controller 510 may include a host interface 511, a control block 513, a command generator 515, and a memory interface 517. The memory controller 510 may be included in a CPU, GPU, AP, or the like. In this case, the host HOST may mean the components other than the memory controller 510 in these configurations. For example, when the memory controller 510 is included in the CPU, the host HOST of the figure may represent the remaining components except for the memory controller 510 in the CPU.

The host interface 511 may be an interface for communication between the host HOST and the memory controller 510.

The control block 513 may control overall operations of the memory controller 510 and schedule the operations to be commanded to the memory 520. The control block 513 may change the order of operations to be commanded to the memory 520 to be different from the order that the requests from the host HOST are received in order to improve the performance of the memory 520. For example, even though the host HOST first requests for a read operation of the memory 520 and then requests for a write operation later, the control block 513 may adjust the order in such a manner that the write operation is performed before the read operation.

The command generator 515 may generate a command to be applied to the memory 520 according to the order of the operations determined by the control block 513.

The memory interface 517 may be provided for interface between the memory controller 510 and the memory 520. A command and an address CA may be transferred and data DATA may be transferred/received from the memory controller 110 to the memory 120 through the memory interface 117. Also, the memory interface 517 may receive a correction signal CORRECT from the memory 520. The memory controller 510 may need to change its read latency RL according to the level of the correction signal CORRECT, which will be described later by referring to the drawings.

The memory 520 may perform an operation commanded by the memory controller 510. The memory 520 will be described in detail below with reference to FIG. 6.

Figure 6:
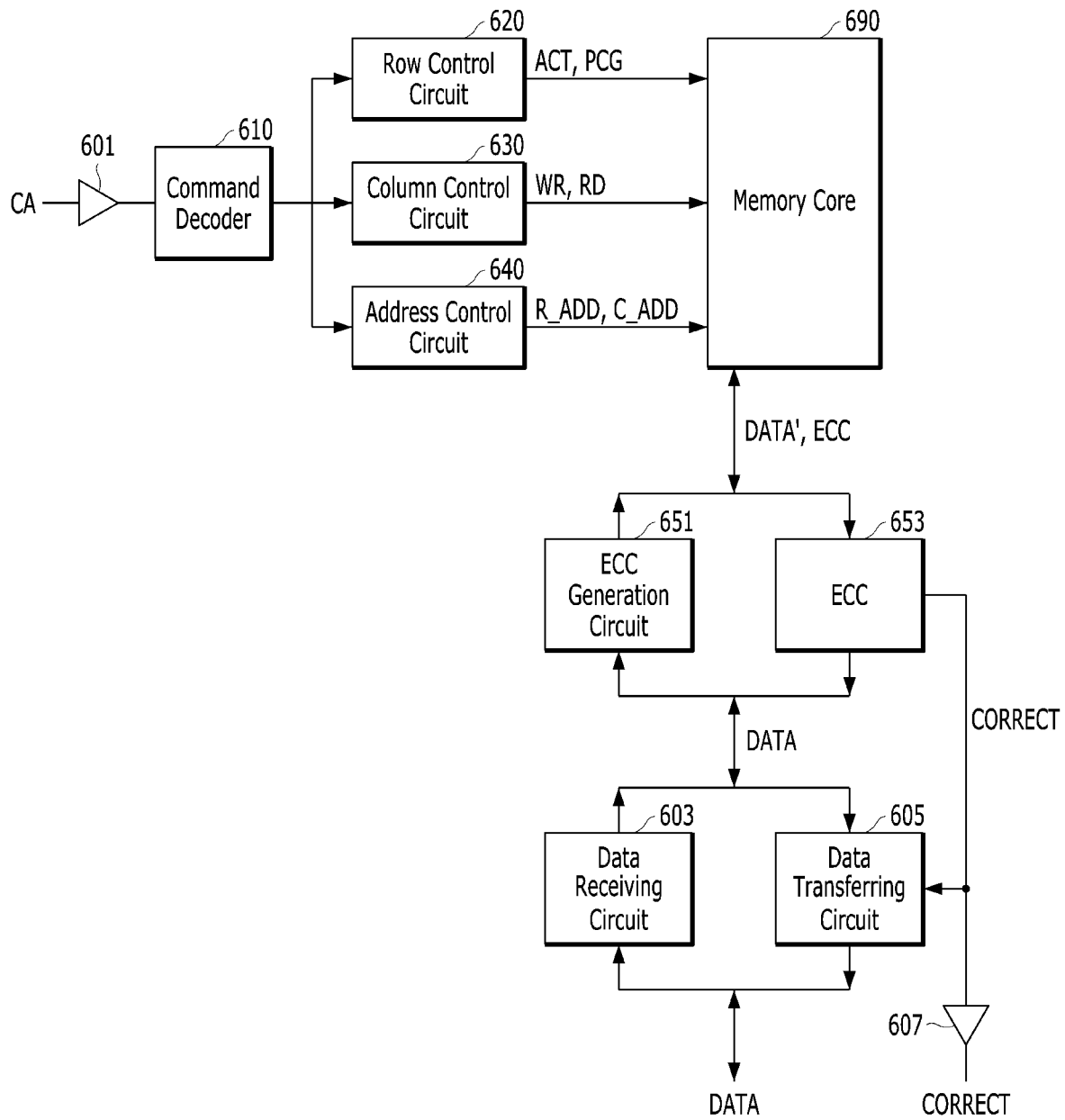
FIG. 6 is a configuration diagram illustrating a memory 520 shown in FIG. 5 in accordance with an embodiment of the present disclosure.

FIG. 6 is a configuration diagram illustrating the memory 520 shown in FIG. 5 in accordance with an embodiment of the present disclosure.

Referring to FIG. 6, the memory 520 may include a command address receiving circuit 601, a data receiving circuit 603, a data transferring circuit 605, a correction signal transferring circuit 607, a command decoder 610, a row control circuit 620, a column control circuit 630, an address control circuit 640, an error correction code generation circuit 651, an error correction circuit 653, and a memory core 690.

The command address receiving circuit 601 may receive a command and an address CA. Depending on the type of the memory 520, a command and an address may be input to the same input terminals, or a command and an address may be input to different input terminals. Herein, it is illustrated that the command and the address are input to the same input terminals. The command and the address CA may be multiple bits.

The data receiving circuit 603 may receive data DATA transferred from the memory controller 510 during a write operation. The data DATA may be transferred to the memory 520 through a plurality of data pads, and serially consecutive data may be input to the data pads. The data receiving circuit 603 may perform a serial-to-parallel conversion operation onto the received data and control timing and the like. Since the data DATA input to the data receiving circuit 603 and the output data DATA are the same data except that they are in different forms (e.g., a parallel form and a serial parallel form), the same symbol is used.

The data transferring circuit 605 may transfer the data DATA to the memory controller 510 during a read operation. The data transferring circuit 605 may perform a parallel-to-serial conversion operation onto the data to be output and control timing and the like. In particular, the data transferring circuit 605 may change the output timing of the data DATA according to the logic level of the correction signal CORRECT. When the correction signal CORRECT is deactivated, the data DATA is output to the memory controller 510 with a short read latency, and when the correction signal CORRECT is activated, the data DATA is output to the memory controller 510 with a long read latency. Since the data DATA input to the data transferring circuit 605 and the data DATA output from the data transferring circuit 605 are the same data only in different forms, the same symbol is used.

The command decoder 610 may decode the command and the address CA to find out the type of the operation commanded by the memory controller 510 to the memory 520.

When it turns out as a result of decoding of the command decoder 610 that row-based operations such as an active operation and a precharge operation are commanded, the row control circuit 620 may control these operations. An active signal ACT may be a signal commanding an active operation, and a precharge signal PCG may be a signal commanding a precharge operation.

When it turns out as a result of decoding of the command decoder 610 that column-based operations such as a write operation and a column operation are commanded, the column control circuit 630 may control these operations. A write signal WR may be a signal commanding a write operation, and a read signal RD may be a signal commanding a read operation.

The address control circuit 640 may determine the address received from the command decoder 610 as a row address R_ADD or a column address C_ADD, and transfer it to the memory core 690. When it turns out as a result of decoding of the command decoder 610 that a row-based operation is commanded, the address control circuit 640 may determine the received address as a row address R_ADD, and when it turns out as a result of decoding of the command decoder 610 that a column-based operation is commanded, the address control circuit 640 may determine the received address as a column address C_ADD.

The error correction code generation circuit 651 may generate an error correction code ECC based on the data DATA during a write operation. During the write operation, the error correction code ECC may be generated based on the data DATA, but the error of the data DATA may not be corrected. Therefore, during a write operation, the data DATA input to the error correction code generation circuit 651 and the data DATA' output from the error correction code generation circuit 651 may be the same.

The error correction circuit 653 may detect the error in the data DATA' read from the memory core 690 based on the error correction code ECC read from the memory core 690 during a read operation, and when the detected error is equal to or greater than a threshold value, the error of the read data DATA' may be corrected. When the error correction circuit 653 corrects the error of the data DATA', the correction signal CORRECT may be activated. When the error correction circuit 653 corrects the error in the data DATA', it may take a long time for the error correction circuit 653 to process the data DATA', and when the error correction circuit 653 does not correct the error in the data DATA', it may take a short time for the error correction circuit 653 to process the data DATA'.

The correction signal transferring circuit 607 may transfer the correction signal CORRECT to the memory controller. The correction signal transferring circuit 607 may transfer the correction signal CORRECT to the memory controller 520 by using a pad that is not used during a read operation among the input or output pads of the memory 510. For example, a data mask pad of the memory 510 is not used during a read operation, and the correction signal transferring circuit 607 may transfer the correction signal CORRECT to the memory controller 520 by using the pad.

The memory core 690 may perform the operations commanded by the internal command signals ACT, PCG, WR, and RD. The memory core 690 may include components for such operations as an active operation, a precharge operation, a read operation, a write operation, and the like, for example, a cell array including memory cells that are arranged in a plurality of rows and a plurality of columns, a row decoder for activating/deactivating a row of the cell array, a column decoder for inputting/outputting data to/from the cell array, and an input/output circuit. When an active signal ACT is activated, a row selected based on the row address R_ADD among the rows of the memory core 690 may be activated. When a precharge signal PCG is activated, the activated row may be deactivated. When a write signal WR is activated, the data DATA' and the error correction code ECC may be written into the columns selected based on the column address C_ADD among the columns of the memory core 690, and when a read signal RD is activated, the data DATA' and the error correction code ECC may be read from the columns selected based on the column address C_ADD among the columns of the memory core 690.

When an error is equal to or greater than a threshold value is detected by the error correction circuit 653 during a read operation and the error in the data DATA' is corrected, the memory 520 may transfer the read data DATA to the memory controller 510 with a long read latency. Also, when an error is less than a threshold value is detected by the error correction circuit 653 during a read operation and the error in the data DATA' is not corrected, the memory 520 may transfer the read data DATA to the memory controller 510 with a short read latency. In other words, the read latency of the memory 520 may be changed depending on whether an error in the data DATA' is corrected or not. When an error in the data DATA' is corrected, a read operation is performed with a long read latency. Therefore, it may be possible to secure a sufficient time for error correction. Also, when the error of the data DATA' is not corrected, a read operation may be performed with a short read latency. This may lead to improvement in the performance of the memory system 600.

The memory 520 may include one or more chips. The memory 520 may be formed of a single chip or may be formed of a plurality of chips being stacked.

Figure 7:
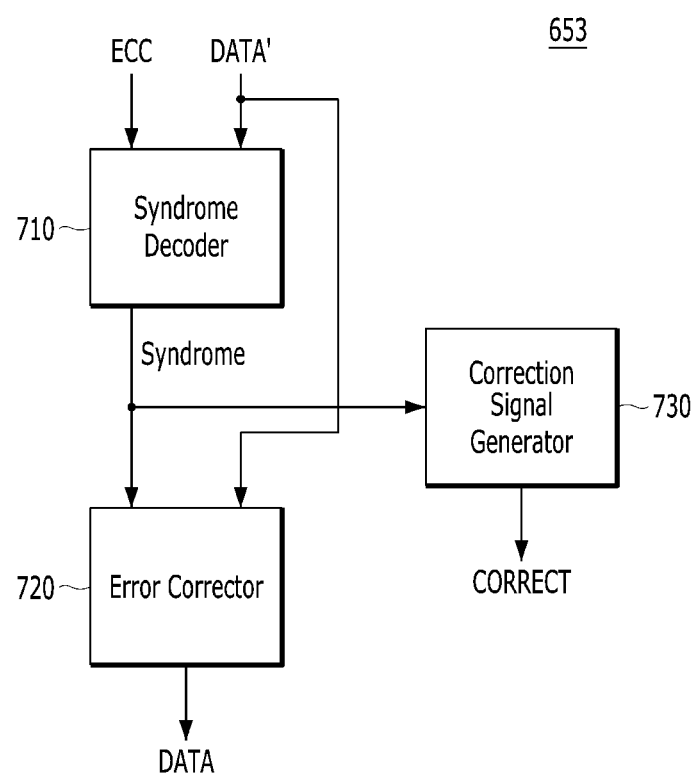
FIG. 7 is a configuration diagram illustrating an error correction circuit 653 shown in FIG. 6 in accordance with an embodiment of the present disclosure.

FIG. 7 is a configuration diagram illustrating the error correction circuit 653 shown in FIG. 6 in accordance with an embodiment of the present disclosure.

Referring to FIG. 7, the error correction circuit 653 may include a syndrome decoder 710, an error corrector 720, and a correction signal generator 730.

The syndrome decoder 710 may generate a syndrome through an operation using the error correction code ECC and the data DATA'. Whether or not an error exists in the data DATA' may be checked only with a syndrome, and an additional operation using the syndrome may be required to correct the error.

The error corrector 720 may check whether an error in the data DATA' is equal to or greater than the threshold value based on the value of the syndrome, and when an error is equal to or greater than the threshold value, the error in the data DATA' may be corrected. When an error is less than the threshold value, the error corrector 720 may bypass the data DATA' and output it as it is. Herein, the threshold value may be one bit. In this case, when there is an error in the data DATA', the error corrector 720 may correct the error. Also, the threshold value may be 2 bits. In this case, when there is an error of one bit in the data DATA', the error corrector 720 may not correct the one-bit error in the data DATA', and only when there is an error of 2 bits or more in the data DATA', the error corrector 720 may correct the error in the data DATA'. When it is determined that a 1-bit error in the data DATA' may be handled by the memory controller 510 or the host HOST, the threshold value may be set to 2 bits.

When the error corrector 720 corrects the error of the data DATA', more calculations are required, so the processing time of the error corrector 720 may be increased, and when the error corrector 720 does not correct the error of the data DATA', the data DATA' may be bypassed. Therefore, the processing time of the error corrector 720 may be shortened.

The correction signal generator 730 may check whether there is an error more than the threshold value by using the syndrome, and when the error is equal to or greater than the threshold value, the correction signal generator 730 may activate the correction signal CORRECT. The correction signal CORRECT may be a signal activated when the error corrector 720 corrects an error of the data DATA'.

Figure 8:
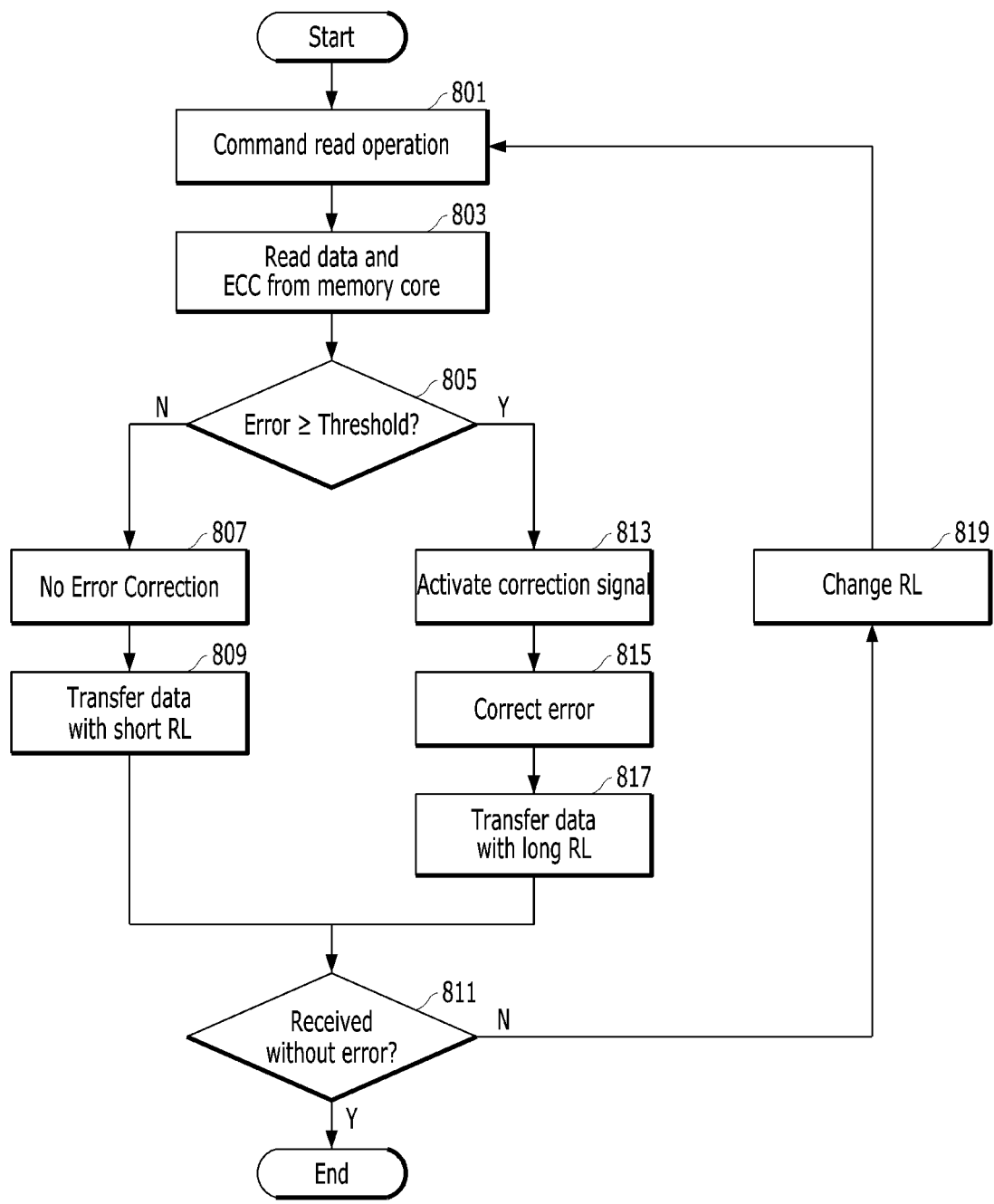
FIG. 8 illustrates an embodiment of a read operation of the memory system 500 shown in FIG. 5 in accordance with an embodiment of the present disclosure.

FIG. 8 illustrates an embodiment of a read operation of the memory system 500 shown in FIG. 5. The memory 520 and the memory controller 510 may be basically set to operate with a short read latency (e.g., 16 clocks), and may operate with a long read latency (e.g., 20 clocks) when a condition is satisfied during an operation.

Referring to FIG. 8, the memory controller 520 may command the memory 520 to perform a read operation in operation 801. The read operation may be commanded as the memory controller 510 transfers a read command and an address to the memory 520.

The data DATA' and the error correction code ECC may be read from the memory core 690 of the memory 510 in operation 803.

The error correction circuit 653 may determine whether the error in the data DATA' is equal to or greater than a threshold value in operation 805. It may be determined whether the error of the data DATA' is equal to or greater than the threshold value by using the syndrome which is generated by the syndrome decoder 710 of the error correction circuit 653.

When the error of the data DATA' is less than the threshold value (N in the operation 805), the error of the data DATA' may not be corrected in operation 807. Also, the data transferring circuit 605 may transfer the data DATA to the memory controller 510 with a short read latency in operation 809. For example, the data transferring circuit 605 may transfer the data DATA to the memory controller 510 at a moment when as much time as a short read latency (e.g., 16 clocks) passes from the moment when the read command is applied.

Since the memory controller 510 is set to a short read latency and the data transferring circuit 605 of the memory 520 transfers the data DATA to the memory controller 510 according to the short read latency, the memory controller 510 may receive the data according to the set read latency, i.e., the short read latency (Y in operation 811). In this case, the read operation may be terminated.

When the error of the data DATA' is equal to or greater than the threshold value (Y in the operation 805), the correction signal CORRECT may be activated in operation 813, and the activated correction signal CORRECT may be transferred from the memory 520 to the memory controller 510. Also, the error in the data DATA' may be corrected in operation 815. Also, the data transferring circuit 605 may transfer the error-corrected data DATA to the memory controller 510 with a long read latency in operation 817. For example, the data transferring circuit 605 may transfer the data DATA to the memory controller 510 at a moment when as much time as the long read latency (e.g., 20 clocks) passes from the moment when the read command is applied. Since the memory controller 510 is set to a short read latency and the data transferring circuit 605 of the memory 520 transfers the data DATA to the memory controller 510 according to the long read latency, the memory controller 510 may not receive the data DATA correctly according to the set read latency, i.e., the short read latency (N in operation 811). That is, the memory 520 is set to have a short read latency, and, when the correction signal CORRECT transferred from the memory 520 is activated, it may be seen that the memory controller 510 does not receive the data DATA correctly.

In this case (N in operation 811), the memory controller 510 may set its own read latency to be long in operation 819, and the memory controller 510 may command the memory 520 to perform a read operation for the same address of the previous read operation in operation 801. As a result, the operations Y in the operations 803 and 805, 813, 815, and 817 may be performed again, and this time, since the memory controller 510 is set to a long read latency, the data DATA may be received according to the set read latency (Y in the operation 811). The read operation may be ended.

Setting the read latency of the memory controller 510 to be long in the operation 819 may not be permanent but may be temporary for one read operation.

Referring to FIG. 8, when an error of more than the threshold value is detected by the error correction circuit 653 during a read operation of the memory system 500 and the error of data DATA' is corrected, a read operation may be performed with a long read latency. Also, when an error of less than the threshold value is detected by the error correction circuit 653 during a read operation of the memory system 500 and the error of the data DATA' is not corrected, the read operation may be performed with a short read latency. That is, most of the read operations in which there is no error may be performed with a short latency, and only some of the read operations in which an error is to be detected may be performed with a long latency.

Figure 9:
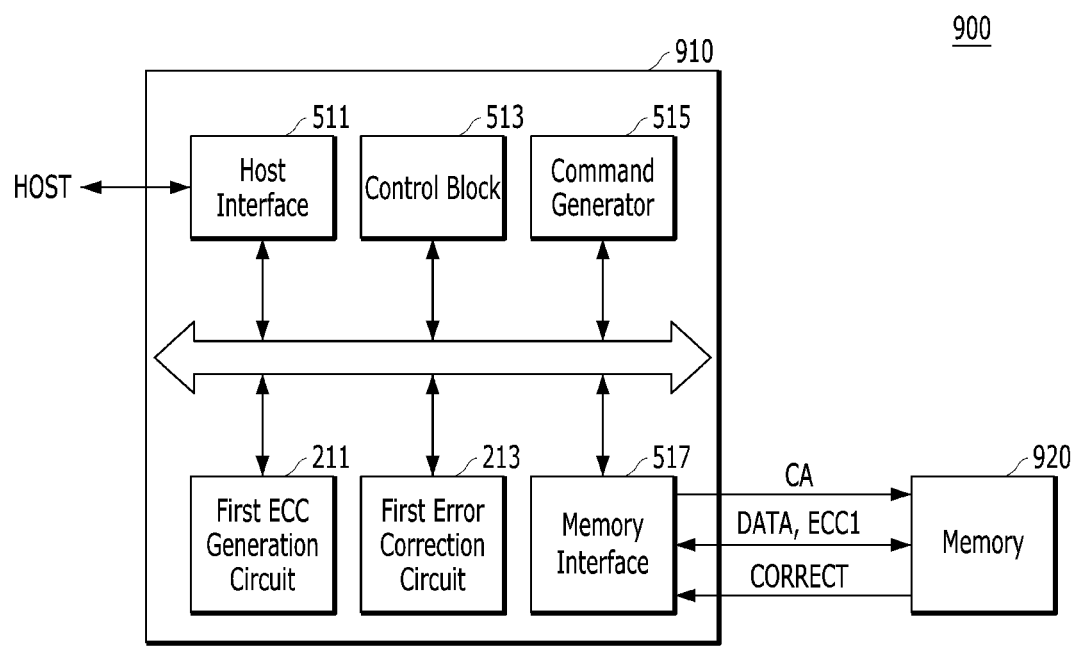
FIG. 9 is a configuration diagram illustrating a memory system 900 in accordance with an embodiment of the present disclosure.

FIG. 9 is a configuration diagram illustrating a memory system 900 in accordance with an embodiment of the present disclosure.

The memory system 900 of FIG. 9 may include the features of the memory system 200 shown in the second embodiment of the present disclosure and the features of the memory system 500 shown in the fourth embodiment of the present disclosure. The memory system 900 may include a memory controller 910 and a memory 920.

The memory controller 910 may further include a first error correction code generation circuit 211 and a first error correction circuit 213 in addition to the components of the memory controller 510.

The first error correction code generation circuit 211 may generate a first error correction code ECC1 based on the data transferred from the host during a write operation, that is, write data to be written into the memory 220.

The first error correction circuit 213 may detect an error in the data DATA transferred from the memory 920 based on the first error correction code ECC1 transferred from the memory 920 during a read operation, and correct the detected error. The data corrected by the first error correction circuit 213 may be transferred to the host.

The memory 920 may perform an operation commanded by the memory controller 910. The memory 920 will be described in detail with reference to FIG. 10.

Figure 10:
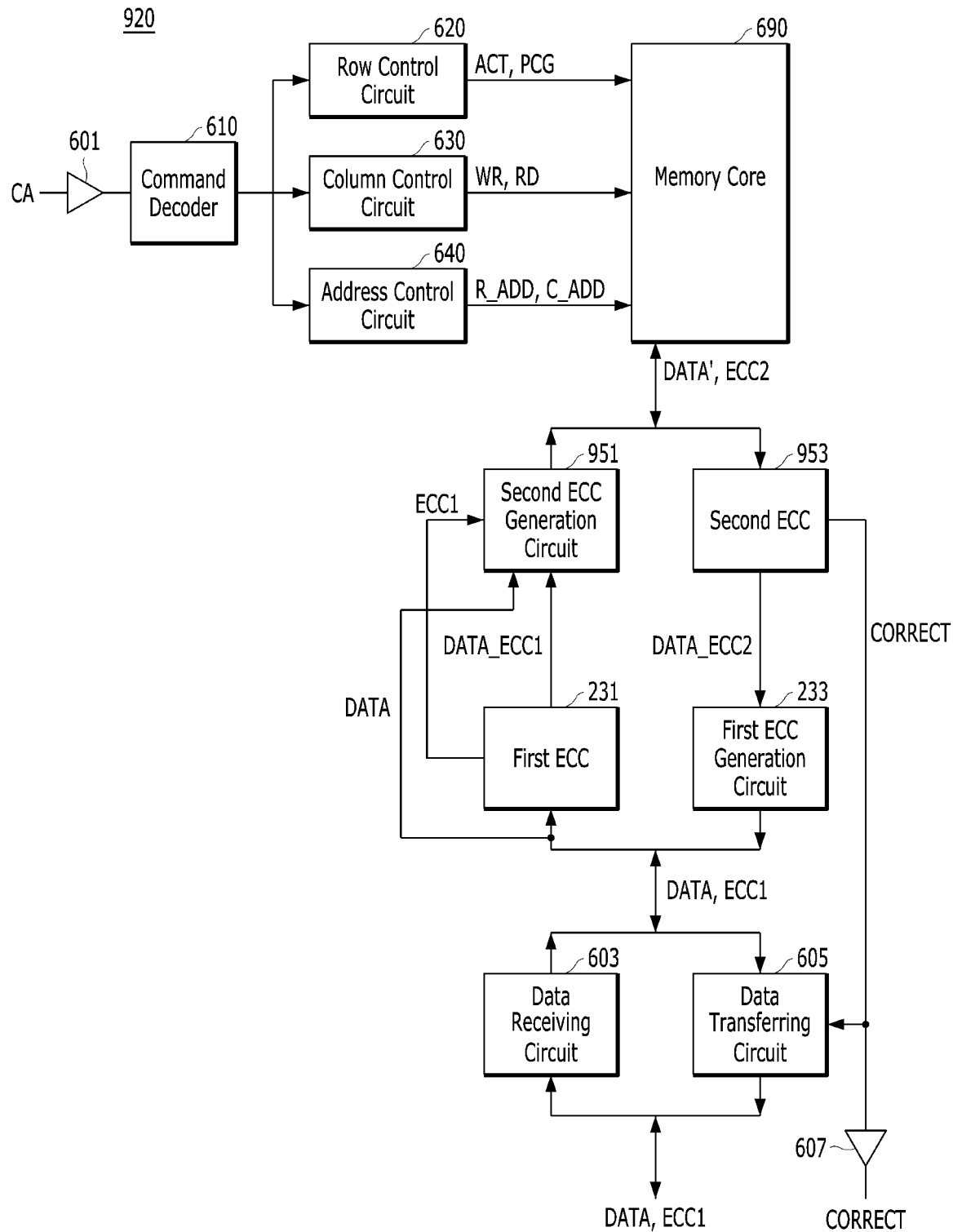
FIG. 10 is a configuration diagram illustrating a memory 920 shown in FIG. 9 in accordance with an embodiment of the present disclosure.

FIG. 10 is a configuration diagram illustrating a memory 920 shown in FIG. 9 in accordance with an embodiment of the present disclosure.

Referring to FIG. 10, the memory 920 may further include a first error correction circuit 231 and a first error correction code generation circuit 233 in addition to the components of the memory 520 shown in FIG. 6.

The first error correction circuit 231 may detect an error in the data DATA based on the first error correction code ECC1 which is transferred from the memory controller 910 through the data receiving circuit 603 during a write operation, and correct the detected error. When there is no error in the data DATA, the data DATA and the data DATA_ECC1 may be the same, and when there is an error in the data DATA, the data DATA and the data DATA_ECC1 may be different from each other. The error signal ERR1 which is output from the first error correction circuit 231 may be a signal that is activated when an error in the data DATA is detected.

The second error correction code generation circuit 951 may perform a first operation of generating a second error correction code ECC2 based on the data DATA transferred from the memory controller 910 during a write operation. The first operation of the second error correction code generation circuit 951 may be performed in parallel to the error correction operation of the first error correction circuit 231. When the first error correction circuit 231 detects an error, the error signal ERR1 may be activated, and the second error correction code generation circuit 951 may cancel the first operation in response to the activation of the error signal ERR1. Also, a second operation of generating a second error correction code ECC2 may be performed based on the data DATA_ECC1 whose error is corrected by the first error correction circuit 231 instead of the data DATA. The second error correction code generation circuit 951 may basically generate the second error correction code ECC2 based on the data DATA, but only when an error is detected in the data DATA, the second error correction code generation circuit 951 may generate the second error correction code ECC2 based on the error-corrected data DATA_ECC1. In most cases where there is no error in the data DATA, the first operation of the second error correction code generation circuit 951 may be performed in parallel to the error correction operation of the first error correction circuit 231. As a result, the second error correction code ECC2 may be quickly generated.

The second error correction circuit 653 has the same structure and operation as the error correction circuit 653 of FIG. 6. The second error correction circuit 653 may detect an error in the data DATA' that is read from the memory core 690 based on the second error correction code ECC2, and when an error equal to or greater than the threshold value is detected, the error of the data DATA' may be corrected.

The first error correction code generation circuit 233 may generate the first error correction code ECC1 based on the data DATA_ECC2. Since the first error correction code generation circuit 233 only generates the first error correction code ECC1 based on the data DATA_ECC2 and does not correct the error of the data DATA_ECC2, the data DATA_ECC2 and the data DATA may be the same.

When the first error correction circuit 231 detects an error in the data DATA during a write operation, the memory 920 of FIG. 10 may quickly generate the second error correction code ECC2 so as to have a feature of reducing the latency of the write operation. Also, when the second error correction circuit 653 does not detect an error equal to or greater than the threshold value during a read operation, the memory 920 may perform a read operation with a short read latency so as to have a feature of reducing the latency of the read operation.

Although various embodiments have been described for illustrative purposes, it will be apparent to those skilled in the art that various changes and modifications may be made without departing from the spirit and scope of the invention as defined in the following claims. Furthermore, the embodiments may be combined to form additional embodiments.

What is claimed is:

1. A memory, comprising:
   a memory core;
   an error correction circuit suitable for correcting, when a number of one or more errors detected in data read from the memory core is equal to or greater than a threshold value, the detected errors based on an error correction code read from the memory core to produce an error-corrected data; and
   a data transferring circuit suitable for:
   outputting, when the detected errors are corrected, the error-corrected data according to a long read latency, and
   outputting, when the number of the detected errors is less than the threshold value or no error is detected in the read data, the read data according to a short read latency.

2. The memory of claim 1, wherein the threshold value is one bit.

3. The memory of claim 1, wherein the threshold value is 2 bits.

4. The memory of claim 1, wherein the error correction circuit includes:
   a syndrome decoder suitable for generating a syndrome based on the read error correction code and the read data;
   an error corrector suitable for correcting the detected errors based on the syndrome; and
   a correction signal generator suitable for generating a correction signal indicating whether the detected errors are corrected.

5. The memory of claim 4, further comprising a correction signal transferring circuit suitable for transferring the correction signal.

6. The memory of claim 1, further comprising an error correction code generation circuit suitable for generating an error correction code to be written into the memory core based on the data to be written into the memory core.

7. A memory system, comprising:
   a memory; and
   a memory controller suitable for controlling the memory, wherein the memory includes:
   a memory core;
   an error correction circuit suitable for correcting, when a number of one or more errors detected in data read from the memory core is equal to or greater than a threshold value, the detected errors based on an error correction code read from the memory core to produce an error-corrected data; and
   a data transferring circuit suitable for:
   providing, when the detected errors are corrected, the memory controller with the error-corrected data according to a long read latency, and providing, when the number of the detected errors is less than the threshold value or no error is detected in the read data, the memory controller with the read data according to a short read latency.

8. The memory system of claim 7, wherein the threshold value is one bit.

9. The memory system of claim 7, wherein the threshold value is 2 bits.

10. The memory system of claim 7, wherein the error correction circuit includes:
a syndrome decoder suitable for generating a syndrome based on the read error correction code and the read data;
an error corrector suitable for correcting the detected errors based on the syndrome; and
a correction signal generator suitable for generating a correction signal indicating whether the detected errors are corrected.

11. The memory system of claim 7, wherein the memory further includes a correction signal transferring circuit suitable for providing the memory controller the correction signal indicating whether the detected errors are corrected.

12. The memory system of claim 11, wherein the memory controller is further suitable for:
commanding, as a default, the memory to perform a read operation of reading the data while setting the short read latency, and
commanding, in response to the correction signal that is activated, the memory to perform the read operation again while setting the long read latency.

13. A method for operating a memory system, comprising:
commanding, by a memory controller, a memory to perform a read operation for a first address;
reading, by a memory, a first data and a first error correction code from a region designated by the first address in a memory core of the memory;
detecting, by the memory, no error in the first data based on the first error correction code;
providing, by the memory, the first data to the memory controller after a short read latency from the commanding regarding the read operation for the first address, in response to the detection of no error;
commanding, by the memory controller, the memory to perform a read operation for a second address;
reading, by the memory, a second data and a second error correction code from a region designated by the second address in the memory core of the memory;
correcting, by the memory, an error in the second data based on the second error correction code to produce an error-corrected second data when the error is detected in the second data; and
providing, by the memory, the error-corrected second data to the memory controller after a long read latency from the commanding regarding the read operation for the second address, in response to the correcting.

14. The method of claim 13, further comprising before the providing of the error-corrected second data:
providing, by the memory, the memory controller with a correction signal, which is deactivated, when any error is not detected in the second data; and
providing, by the memory, the memory controller with the correction signal, which is activated, upon the correcting.

15. The method of claim 14, further comprising before the providing of the error-corrected second data commanding, by the memory controller in response to the activated correction signal, the memory to perform the read operation for the second address again while setting the read latency of the memory controller to the long read latency.

16. A memory system, comprising:
a memory; and
a memory controller suitable for transferring a write data and a first write error correction code to the memory during a write operation,
wherein the memory includes:
a first error correction circuit suitable for correcting an error in the write data to produce an error-corrected write data when the error is detected on a basis of the first write error correction code;
a second error correcting code generation circuit suitable for generating a second write error correction code based on the write data when any error is not detected in the write data and based on the error-corrected write data when the detected error is corrected;
a memory core suitable for storing therein the second write error correction code and a corresponding one of the write data and the error-corrected write data;
a second error correction circuit suitable for correcting one or more errors in data read from the memory core to produce an error-corrected read data when the errors are detected on a basis of a second read error correction code read from the memory core, a number of the detected errors in the read data being equal to or greater than a threshold value;
a first error correction code generation circuit suitable for generating a first read error correction code based on the read data when the number of the detected errors is less than the threshold value or no error is detected in the read data and based on the error-corrected read data when the detected errors are corrected; and
a data transferring circuit suitable for:
providing, when the detected error are corrected, the memory controller with the error-corrected read data and the first read error correction code according to a long read latency, and
providing, when the number of the detected errors is less than the threshold value or no error is detected in the read data, the memory controller with the read data and the first read error correction code according to a short read latency.

17. The memory system of claim 16, wherein the threshold value is one bit.

18. The memory system of claim 16, wherein the threshold value is 2 bits.

19. The memory system of claim 16, wherein the second error correction circuit includes:
a syndrome decoder suitable for generating a syndrome based on the second read error correction code and the read data;
an error corrector suitable for correcting the detected errors based on the syndrome; and
a correction signal generator suitable for generating a correction signal indicating whether the detected errors are corrected.

20. The memory system of claim 16, wherein the memory further includes a correction signal transferring circuit suitable for providing the memory controller the correction signal indicating whether the detected errors are corrected.

21. An operating method of a memory system, the operating method comprising:

providing, by a controller, a memory with a first read command for reading data stored in the memory while setting a first read latency;
reporting, by the memory in response to the first read command, error-correction of the read data;
providing, by the controller in response to the reporting, the memory with a second read command for reading the data while setting a second read latency; and
providing, by the memory in response to the second read command, the controller with the error-corrected data according to the second read latency,
wherein the second read latency is longer than the first read latency.

\* \* \* \* \*